March 22, 1960

C. F. HAGEN 2,929,277

ADJUSTABLE DRILL JIG

Filed June 24, 1958

INVENTOR.
CARL F. HAGEN
BY [signature]

United States Patent Office 2,929,277
Patented Mar. 22, 1960

2,929,277

ADJUSTABLE DRILL JIG

Carl F. Hagen, Racine, Wis.

Application June 24, 1958, Serial No. 744,136

4 Claims. (Cl. 77—62)

My invention relates to a jig and it relates more particularly to an improved form of a drill jig wherein an adjustable stop is provided to positively space each succeeding work piece as it is clamped under a drill plate and in addition providing a gauge to enable additional holes to be drilled in a work piece at various angles to each other as desired.

My invention still further relates to a jig of this general character embodying novel features of construction which permit the clamping of a piece of work with minimum or no interference and in a set position and having in combination a gauge to enable said work piece to be arranged for drilling a hole at any angle with respect to a first hole.

My invention still further relates to a jig of the character described in which the moving parts are provided with bearing surfaces to afford maximum strength and accuracy in supporting the work piece in position.

Other novel features of construction and advantage will be more clearly apparent from the following specification and the accompanying drawings, in which.

Figures 1, 2:
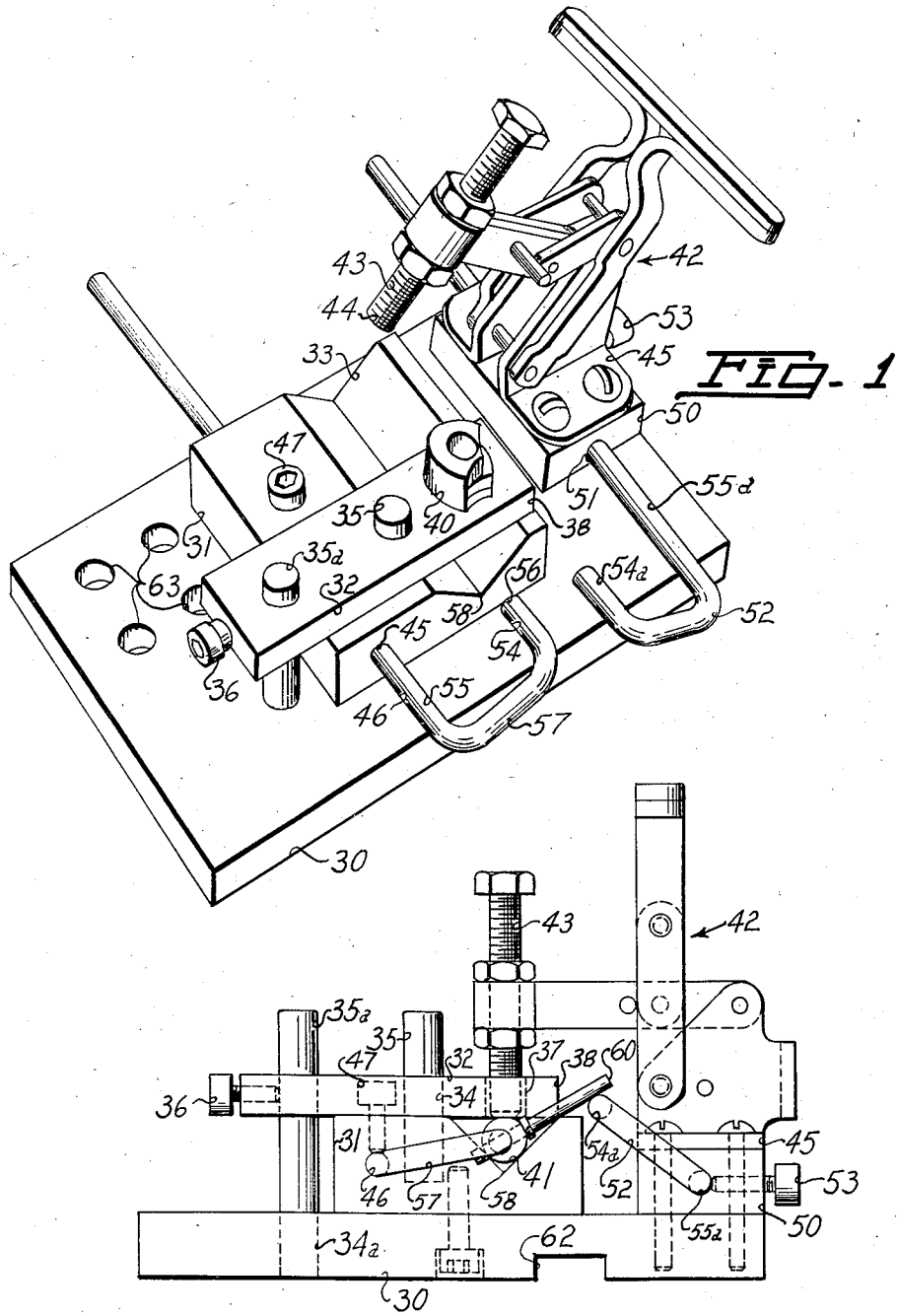
Figure 1 is a perspective view showing a jig embodying my invention.
Figure 2 is a side elevation of the jig shown in Figure 1.

In Figs. 1 to 2 I show one form of construction in which I utilize a base, platform or casting 30 on which is mounted the V-block and work holding member 31. In this construction it will be noted that the movable drill plate 32 overhangs the working part of the jig which is represented by the V-shaped portion 33 cut or formed cross-wise of the member 31. The plate 32 has a vertical aperture 34 in line with aperture 34a formed in said base 30 and through which extend so-called pins 35 and 35a to hold said plate in position. The plate is secured to the pin 35 by a thumb screw 36 which may be turned to bear directly on the pin 35a. Another aperture 37 is formed adjacent the free end 38 of the plate 32 and receives a drill bushing 40 in which a drill may be projected through to engage the work piece 41 nesting in said V-groove and held firmly in position by the locking device 42. The movable plate 32 keeps the drill bushing 40 in position relative to the V-groove and because the plate is adjustable in a vertical direction, various sizes of stock can be drilled. This locking device or clamp has a threaded bolt 43, the end 44 arranged to bear strongly on the work piece. Additional pressure on the work piece may be had by rotating said bolt on said work. This clamp has a holding pressure of 250 pounds and retains the piece part in a positive position.

The plate 31 has a longitudinally extending aperture 45 in which the adjusting rod stop 46 is mounted. This rod is arranged comparatively loosely in said aperture and held in any position by a set screw 47 threadedly mounted in the top of the plate 31.

The clamping device 42 has spaced wings 45 which are secured to a block 50 of substantial depth which is either integral with said base or secured in any suitable manner thereto. Said block has a longitudinally extending aperture 51 in which another adjustment rod 52 is mounted. This rod moves freely within said aperture and is held temporarily in position by a set screw 53.

The rods 46 and 52 are similar and in each instance are bent at one end to provide end extensions 54 and 54a which are parallel to the main members 55 and 55a, respectively. As will be readily noted, the member 55 is of much greater length than the extension 54.

In operation, the drill plate 32 is raised on the pins 35 and 35a to permit placement of the work piece 41 in the V-groove. The forward position of the work piece is limited or determined by the locked position of the rod 46 wherein the end 56 of extension 54 operates as a stop for the forward movement of the work piece. This is brought about by making the intermediate portion 57 of the rod 46 of sufficient length so that the extension 54 is substantially in line with the peak 58 of the V-groove. The drill plate 32 may then be lowered onto the work piece and clamped in position by forcing the end of the set screw 36 to bear on the pin 35a. After this is done, the clamp is operated to cause the threaded bolt 43 to bear strongly on the work piece 41. The clamp itself is of well known manufacture and of such nature that it temporarily locks said bolt in position on the work piece. With the particular stop arrangement, as referred to in the foregoing, all work pieces, as each is operated on individually, is placed in such similar forward position to have drilled therein an aperture or hole in identical position adjacent from its forward end.

In certain application of operation it is desirable on a piece of work in which one hole has been drilled to drill additional holes at an angle to the first hole. The rod 52 is used to easily arrange the work piece 41 to carry out the operation of drilling such additional holes at an angle to said first hole. The extension 54a of the rod 52 acts as a gauge. That is, extension 54a is set by an angle gauge at the desired angle. A pin 60 is inserted in the first hole with a part of said pin resting on the extension 54a as shown in Figure 2. The stop 56 sets the work piece in the exact drill position and then the work piece is clamped down.

In the following I have provided a unitary jig whereby an exact position is established for drilling a hole in innumerable pieces of work, one after the other. In addition, an angle gauge is arranged to drill additional holes at an angle to said first hole. All of this is carried out on a device that is economical to build, simple to manufacture and operate and easily carries out the purposes intended.

While the jig itself is intended for drilling purposes, it becomes also a fixture suitable to be used for making key-ways and other similar operations on a milling machine. These can be carried out by providing a cross-wise slot 62 which can correspond with a key mounted in the longitudinal grooves in a milling machine table. In this particular operation any type of key-way or groove may be milled in the work piece as desired.

A series of apertures 63 are formed in the platform 30 for the purpose of providing temporary storage for various sizes of drill bushings. Ordinarily these bushings are scattered around but with the addition of the apertures 63, the extra drill bushings are kept in a ready place and handy to an operator.

It is believed that the many advantages of a jig constructed in accordance with the present invention will be readily understood and although a preferred embodiment of the device is as illustrated and described herein, it is to be understood that changes in the details of construction and in the combination and arrangement of parts may be resorted to which will fall within the scope of the invention claimed.

I claim:

1. A jig comprising, a base structure, a work holding member, a drill plate and a work holding clamp, said member secured to said base and having a V-groove formed in and extending across the top surface thereof, a vertical extending aperture formed in said member in line with a vertical extending aperture formed in said base, a pin anchored in each aperture and extending directly upward therefrom said drill plate provided with spaced apertures and mounted on said pins with one end over-lying said V-groove, said plate having another aperture to receive a drill bushing and so arranged as to be in line with said V-groove, said clamp having a forwardly extending vertically disposed element, the end of said element arranged to bear strongly on a work piece in said V-groove upon manual operation of said clamp, said holding member having a horizontally arranged hole for slideably receiving an adjusting rod, said rod bent at one end and having an intermediate portion and a shortened extension approximately parallel to said slideable portion in the hole, said clamp having a horizontally arranged hole for slideably receiving a second adjusting rod similar to said first rod.

2. A jig comprising, a base structure, a work holding member, a drill plate and a work holding clamp, said drill plate adjustable over said holding member, a plurality of adjustment rods, one of said rods slideable in said work holding member, the other rod slideable in said clamp.

3. A jig comprising, a base structure, a work holding member, a drill plate and a work holding clamp, said member secured to said base and provided with a V-groove formed in and across the top surface thereof, a pin anchored in said base and extending upwardly at right angles therefrom, a pin anchored in said member and extending upwardly at right angles therefrom, said plate having a pair of apertures, the distance between said apertures is the same as the distance between said pins whereby the plate may be raised and lowered on said pins when said plate is mounted through said apertures on said pins, one end of said plate overlying said V-groove and having an aperture for mounting a drill bushing in line with said V-groove, said clamp having a forwardly extending vertically disposed element, the end of said element arranged to bear strongly on any work piece stationed in said V-groove and adaptable to be firmly clamped thereon upon operation of said clamp, said holding member bored horizontally to provide a bore for slideably receiving an adjusting rod, said rod bent into a U-shape at one end, a block secured to said plate, said clamp mounted on said block, said block bored horizontally to provide a bore for slideably receiving an adjusting rod, said rod bent U-shaped at one end.

4. A jig comprising, a base structure, a work holding member, a drill plate and a work holding clamp, said drill plate adjustable vertically over said holding member, a plurality of adjustment rods, one of said rods slideable in said work holding member and temporarily locked therein, the other rod slideable in said clamp and temporarily locked therein.

No references cited.